United States Patent
Smith

(10) Patent No.: US 6,488,848 B1
(45) Date of Patent: Dec. 3, 2002

(54) CLEANABLE FILTER WITH PORTED CYLINDER ADJACENT SCREEN

(75) Inventor: Gerald F. Smith, Watertown, MN (US)

(73) Assignee: Vortex International, LLC, Peoria, IL (US)

( * ) Notice: Subject to any disclaimer, the term of this patent is extended or adjusted under 35 U.S.C. 154(b) by 0 days.

(21) Appl. No.: 09/559,008

(22) Filed: Apr. 24, 2000

(51) Int. Cl.[7] .......................... B01D 21/26; B01D 29/33
(52) U.S. Cl. .................. 210/301; 210/304; 210/308; 210/315; 210/342; 210/440; 210/443; 210/453; 210/512.1
(58) Field of Search .................. 210/299–301, 210/304, 308, 309, 315, 320, 335–338, 342, 492, 512.1, 512.2, 440, 443, 453

(56) References Cited

U.S. PATENT DOCUMENTS

| | | |
|---|---|---|
| 601,392 A | 3/1898 | Bowden |
| 1,149,926 A | 8/1915 | Linke |
| 1,822,006 A | 9/1931 | Bull |
| 1,892,190 A | 12/1932 | Russel |
| 1,908,925 A | 5/1933 | Semon et al. |
| 1,976,914 A | 10/1934 | Benjamin |
| 2,083,005 A | 6/1937 | Czarnecki |
| 2,284,787 A | 6/1942 | Winkler |
| 2,382,278 A | 8/1945 | Widmann |
| 2,390,841 A | 12/1945 | Longden |
| 2,646,886 A | 7/1953 | Le Clair |
| 2,743,018 A | 4/1956 | Belgarde |
| 2,879,892 A | 3/1959 | Frakes |
| 2,933,192 A | 4/1960 | Gretzinger |
| 2,937,754 A | 5/1960 | Kasten |
| 2,983,384 A | 5/1961 | Winslow |
| 3,000,505 A | 9/1961 | Scavuzzo |
| 3,008,543 A | 11/1961 | Bourdale et al. |
| 3,036,711 A | 5/1962 | Wilhelm |
| 3,061,101 A | 10/1962 | Humbert, Jr. |

(List continued on next page.)

FOREIGN PATENT DOCUMENTS

| | | |
|---|---|---|
| DD | 288983 A5 | 4/1991 |
| DE | 3933794 | 4/1991 |
| DE | 4022723 | 4/1991 |
| EP | 0025628 A2 | 3/1981 |
| FR | 2475118 | 8/1981 |
| GB | 1203514 | 8/1970 |
| GB | 1296051 | 11/1972 |
| GB | 2068765 | 8/1981 |
| GB | 2258166 A | 2/1993 |
| SU | 1101273 A | 7/1984 |
| WO | 97/01385 | 8/1981 |
| WO | 95/11072 | 4/1995 |

*Primary Examiner*—Matthew O. Savage
(74) *Attorney, Agent, or Firm*—Gerald E. Helget; Nelson R. Capes; Briggs and Morgan

(57) ABSTRACT

A reusable filter for mounting on an engine is disclosed herein. The filter includes cylindrical reusable filter mounted in a housing. The reusable filter includes an outer screen, an inner screen, and a ported cylinder between the outer and inner screens. The ported cylinder has a plurality of acutely angled oil-directing openings extending toward the inner screen to cause a swirling fluid motion in a partially filtered compartment around the inner screen to assist in trapping sediment in a contaminant trap located between the inner and outer screens.

17 Claims, 7 Drawing Sheets

U.S. PATENT DOCUMENTS

| | | | |
|---|---|---|---|
| 3,095,283 A | 6/1963 | Wheeler, Jr. | |
| 3,122,501 A | 2/1964 | Hultgren | |
| 3,193,101 A | 7/1965 | Humbert, Jr. | |
| 3,224,590 A | 12/1965 | Nord et al. | |
| 3,225,929 A | 12/1965 | Sicard | |
| 3,282,429 A | 11/1966 | Wood et al. | |
| 3,283,902 A | 11/1966 | Farris et al. | |
| 3,289,608 A | * 12/1966 | Laval, Jr. | 210/512.1 |
| 3,289,847 A | 12/1966 | Rothemund | |
| 3,348,695 A | 10/1967 | Rosaen | |
| 3,400,821 A | 9/1968 | Singleton | |
| 3,443,696 A | 5/1969 | Schutte | |
| 3,473,666 A | 10/1969 | Humbert, Jr. | |
| 3,490,597 A | 1/1970 | Casaleggi | |
| 3,502,218 A | 3/1970 | Tuffnell et al. | |
| 3,508,383 A | 4/1970 | Humbert, Jr. | |
| 3,690,460 A | 9/1972 | Lindboe | |
| 3,722,691 A | 3/1973 | Francois | |
| 3,741,394 A | 6/1973 | Defenbaugh | |
| 3,773,180 A | 11/1973 | Harrison | |
| 3,785,491 A | 1/1974 | Dudinec et al. | |
| 3,807,561 A | 4/1974 | Cullis | |
| 3,882,025 A | 5/1975 | Talley, Jr. | |
| 3,988,244 A | 10/1976 | Brooks | |
| 4,045,349 A | 8/1977 | Humbert, Jr. | |
| 4,108,778 A | 8/1978 | Lambert et al. | |
| 4,132,641 A | 1/1979 | Elsworth | |
| 4,349,438 A | 9/1982 | Sims | |
| 4,465,595 A | 8/1984 | Cooper | |
| 4,492,632 A | 1/1985 | Mattson | |
| 4,622,136 A | 11/1986 | Karcey | |
| 4,642,183 A | 2/1987 | Hebert | |
| 4,690,759 A | 9/1987 | Mandy | |
| 4,695,377 A | 9/1987 | Medley, III | |
| 4,700,670 A | 10/1987 | Schade | |
| 4,717,474 A | 1/1988 | Sims | |
| 4,767,530 A | 8/1988 | Gilliam et al. | |
| 4,992,166 A | 2/1991 | Lowsky et al. | |
| 5,015,375 A | 5/1991 | Fleck | |
| 5,047,148 A | 9/1991 | Arai | |
| 5,051,173 A | 9/1991 | Hoelzl | |
| 5,053,129 A | 10/1991 | Kitson | |
| 5,066,180 A | 11/1991 | Lang et al. | |
| 5,066,391 A | 11/1991 | Faria | |
| 5,076,918 A | 12/1991 | Foust et al. | |
| 5,080,787 A | 1/1992 | Brown et al. | |
| 5,082,561 A | 1/1992 | LaPierre | |
| 5,084,162 A | 1/1992 | Conti | |
| 5,089,129 A | 2/1992 | Brigman | |
| 5,171,430 A | 12/1992 | Beach et al. | |
| 5,182,015 A | 1/1993 | Lee | |
| 5,234,592 A | 8/1993 | Schneider | |
| 5,284,579 A | 2/1994 | Covington | |
| 5,291,969 A | 3/1994 | Diederich, Jr. | |
| 5,342,519 A | 8/1994 | Friedmann et al. | |
| 5,376,268 A | 12/1994 | Ikeda | |
| 5,387,340 A | 2/1995 | Ackerman | |
| 5,432,519 A | 7/1995 | Sezai | |
| 5,565,095 A | 10/1996 | Snowball | |
| 5,569,373 A | 10/1996 | Smith et al. | |
| 5,623,755 A | 4/1997 | Childress et al. | |
| 5,785,850 A | 7/1998 | Lynch et al. | |
| 5,830,371 A | 11/1998 | Smith et al. | |
| 6,152,120 A | 11/2000 | Julazadeh | |

* cited by examiner

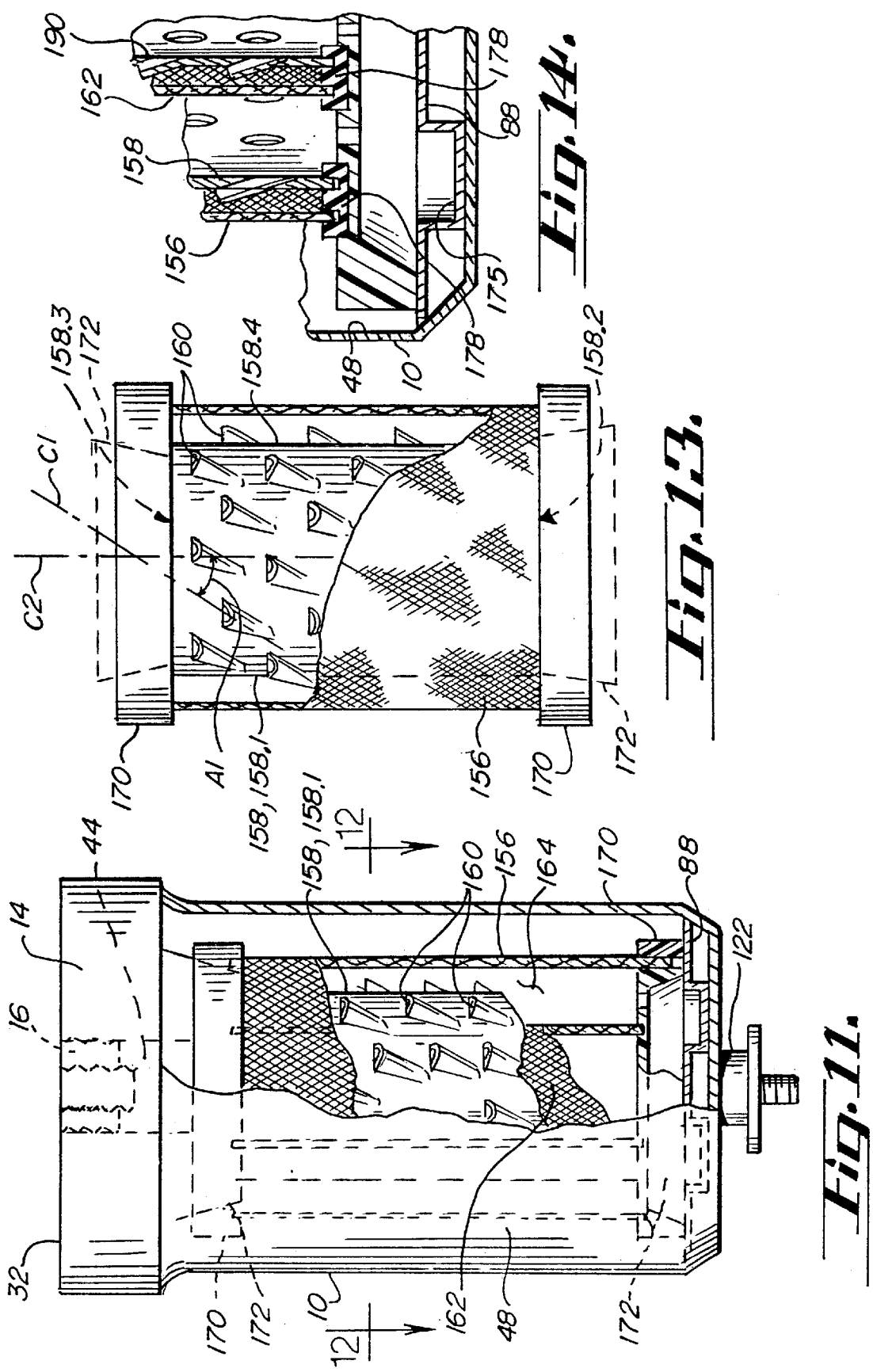

CLEANABLE FILTER WITH PORTED CYLINDER ADJACENT SCREEN

BACKGROUND OF THE INVENTION

This invention relates to filters for filtering fluids such as engine oil, coolant, fuel, hydraulic or transmission fluid. Fluid filters are used to remove contaminants from fluid.

Fluid filters are used to remove contaminants from fluid such as an engine oil. Internal combustion engines use oil to lubricate bearings and reduce friction. This oil is circulated through the engine and carries contaminants such as metal particles, carbon particles and dirt which may cause harm to the engine. In order to effectively lubricate the engine, engine oil is passed through a filter to remove the contaminants before the oil is recirculated into the engine. The typical oil filter is attached to an internal combustion engine at the oil filter receptacle. Engine oil passes through a discharge opening in the oil filter receptacle, into a fluid filter and then into the engine lubrication system through an oil inlet pipe. A filter element in the fluid filter removes contaminates from the oil before it reenters the engine through the oil inlet pipe. Because of the dynamic nature of this process, oil filters must be sealed to protect from oil leaking into the atmosphere.

Oil filters have traditionally been of a disposable type creating a great environmental concern. Used oil filters are disposed of in land fills or by incinerating. Recent improvements in the art have separated the filter elements from the filter canister allowing users to dispose of only the filter element and thus reducing the quantity of waste material. However, a large volume of waste is still generated by disposing of the filter element.

Various engine manufacturers, such as Caterpillar Detroit, etc., use different arrangements for attaching oil filters to their engine blocks. The different mount necessitates additional cost to produce and distribute oil filters. The supply of filters for various engine manufacturers involves the remanufacture of major components of an oil filter or an entire filter assembly in order to adapt a filter product to a particular engine.

There is a need for a fluid filter for filtering a variety of fluids which features a reusable filter element and which can easily be adapted to different connection configurations, especially for use in engines as oil filters.

SUMMARY OF THE INVENTION

A fluid filter which comprises a canister having an open end and a closed end, the canister sealing to an adapter body to prevent leakage between the canister and the adapter body, the adapter body having a plurality of fluid inlet ports extending through the adapter assembly body into the cavity formed by the canister and the adapter body assembly, a threaded fluid outlet port extending through the adapter body, a threaded ring adapter for adapting the outlet port to a variety of connection configurations, a multistage wire mesh filter element having a weave which is designed to prevent fluid contaminants from passing through the filter element while inhibiting the contaminant particles from becoming lodged in the filter mesh, the fluid inlet ports in the adapter body being formed at an angle to create a tornado type turbine fluid motion within the canister to suspend contaminants which are blocked from passage through the screen in the fluid and allow such contaminants to settle in the canister out of the flow path of fluid being filtered, a sediment chamber formed in the canister by a sediment trap, a relief valve assembly in the canister to allow fluid to bypass the filter element in the event the filter element becomes clogged, an anti-siphon valve in the fluid filter to prevent unfiltered fluid from being back-flushed from the filter, a switch for warning of a filter which needs to be removed and cleaned, and a magnetized drain plug to assist with contaminant removal from the fluid and allow the canister to be drained prior to removal to reduce injury and spillage.

An object of the invention is to provide a simple, cost effective method of using cleanable filters. A principle object and advantage of the present invention is that the fluid filter is adaptable to a variety of connections through the use of an inexpensive adapter ring. Specifically, the present invention may be used as an oil filter on an engine and be adapted to the engine with an adapter ring.

A further advantage of the invention is a reusable filter element which will reduce landfill volume and the number of filter elements burned in incinerators and reduce the cost of filter maintenance.

A feature of the invention is a adapter body which has angled fluid inlet ports to create a turbine action within the canister to suspend contaminants, which are filtered from the fluid by the filter element in the swirling unfiltered fluid.

A feature of the invention is a filter element made from a fabric which is woven in a pattern to resist clogging from contaminants. A still further feature of the invention is filter element utilizing multiple layers of different size weave openings to progressively filter fluid as it passes through the filter element and thus reducing clogging while increasing the total surface area of the filter element utilized to filter fluid. Another feature of the invention is a sediment trap which is used with the turbine action created by the angled fluid inlet ports in the adapter body to trap sediment out of the fluid flow path of the filter thus reducing the clogging of the filter and increasing the filter maintenance interval.

Another feature of the invention is a relief valve assembly to allow fluid to continue to flow in the event the filter element becomes clogged. Another feature of the invention is an anti-syphon device built into the fluid filter to prevent fluid from being syphoned out of the unfiltered chamber of the canister and causing damage due to try starting the engine by siphoning the oil out of the fluid filter.

Another feature of the invention is provided by an outer filter screen that filters large particles from the fluid and an inner filter screen with smaller mesh openings that filters smaller particles from the fluid, the two screens providing a multi-stage filter.

Another feature of the invention is a ported cylinder between the outer filter screen and inner filter screen, with angled oil-directing openings that cause the fluid partially-filtered by the outer filter screen to take on a swirling action as it is directed against the inner filter screen, thus keeping contaminants suspended until they are forced to the contaminant trap between the outer filter screen and inner filter screen.

Further features and advantages of the invention are pointed out with the description of the preferred embodiment, drawings and claims of this application.

BRIEF DESCRIPTION OF THE DRAWINGS

FIG. 11 is a perspective view of a second embodiment of the reusable fluid filter;

FIG. 13 is a perspective view of a second embodiment of a cylindrical filter element for use with the reusable fluid filter, with structure cut away to show internal structure;

FIG. 14 is a partial sectional view of the invention in the area of the support plate 88.

DETAILED SPECIFICATION

Figure 1:
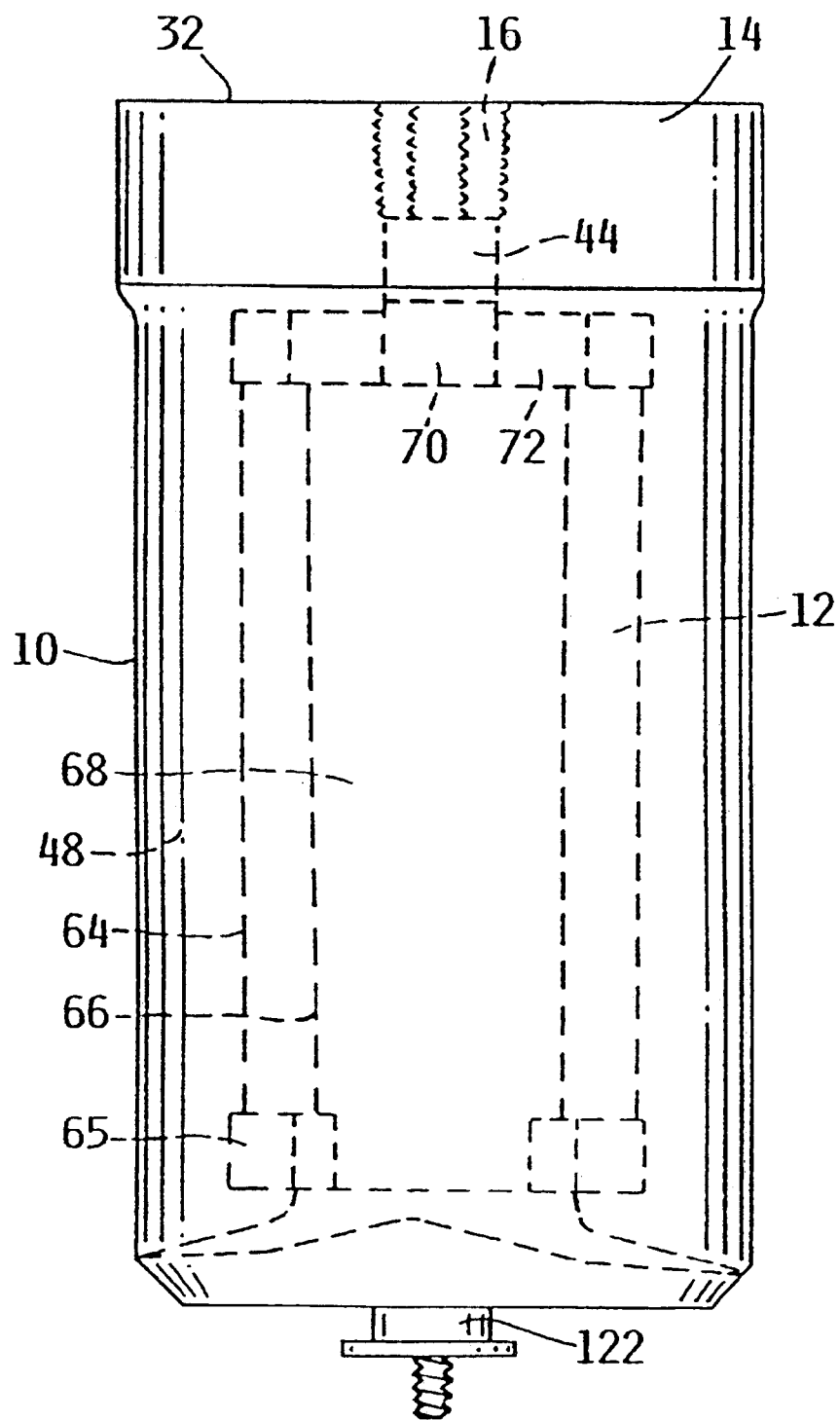
FIG. 1 is a perspective view of the reusable fluid filter.

One form of the invention is illustrated and described herein as an oil filter on an engine. FIG. 1 illustrates reusable fluid filter comprising a canister 10, a filter element 12, and an adapter body 14 and a threaded adapter ring 16.

Figure 2:
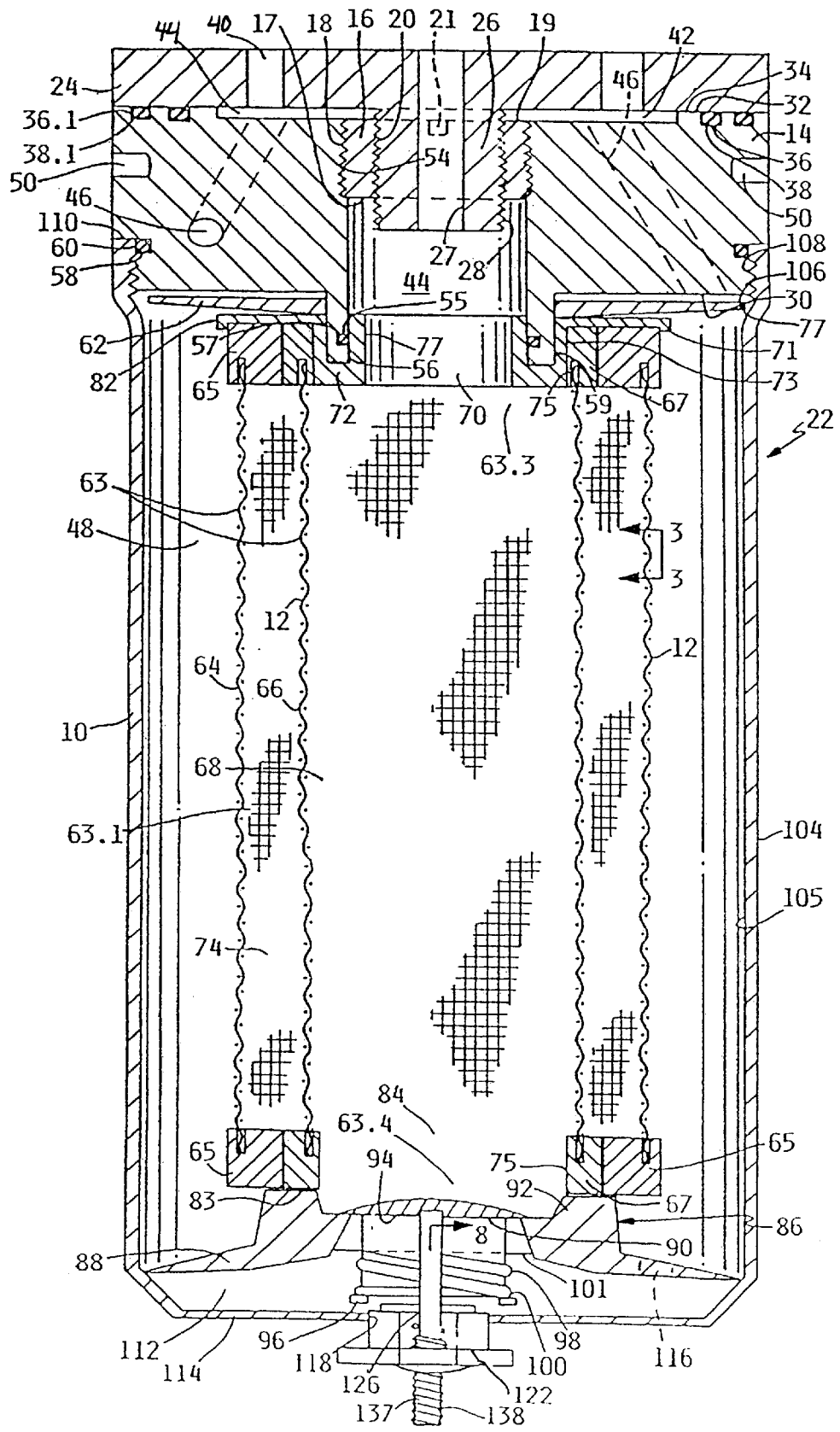
FIG. 2 is a detail section view of a reusable fluid filter including the threaded adapter ring mounted on an engine block as an oil filter.

As illustrated in FIG. 2, the threaded adapter ring 16 has external threads 18 and internal threads 20. External threads 18 are used to threadably mount the adapter ring 16 to a standard reusable fluid filter illustrated in general by the numeral 22. Internal threads 20 are machined to allow fluid filter 22 to be adapted to a wide variety of engines produced by various manufacturers. An engine block 24 typically has an oil filter stub 26 to allow a fluid filter to be threadably attached. Filtered oil tube 27 is formed in filter stub 26 to allow filtered fluid to exit reusable fluid filter 22. This filter stub 26 has external OEM threads 28. Different thread patterns are used by different engine manufacturers.

These external OEM threads 28 cause prior art fluid filters to be manufactured differently to mount on different engines. This causes additional cost for filter manufacturers by producing alternate filters as well as additional costs packaging and warehousing filters with different thread patterns to match to external OEM threads 28. Threaded adapter ring 16 is designed to be an inexpensive device to allow the reusable oil filter 22 to be adapted to a wide variety of filter stubs 26. Internal threads 20 are formed to fit OEM threads 28 and adapts reusable fluid filter 22 to a wide variety of engines while reducing the costs to manufacture, package and distribute reusable fluid filters.

Threaded adapter ring 16 has an inner circular face 17 and an outer circular face 19. Slots 21 are formed along the threaded adapter ring extending to outer circular face 19. These slots allow a tool (not shown) or a large screwdriver (not shown) to be used to tighten threaded adapter ring 16 onto adapter body 14.

Adapter body 14 has an inside face 30 and an outside face 32. Outside face 32 has an annular flat surface 34 and an annular channel cut 36 formed in the annular surface 34. O-ring 38 is mounted in annular channel 36 to form an oil tight seal between adapter body 14 and engine block 24 when adapter body 14 with threaded adapter ring 16 is threadably attached to filter stub 26. A second annular channel 36.1 in outside face 32 may also be used to form an oil tight seal. A second o-ring 38.1 is mounted in channel 36.1 to adapt adapter body 14 to additional manufacturers engines. Unfiltered oil leaves engine block 24 through unfiltered oil ports 40. Unfiltered fluid channel 42 is formed in outside face 32 and allows unfiltered oil to pass through unfiltered fluid inlet orifices 46, through adapter body 14 and into the unfiltered fluid compartment 48 defined between canister 10 and filter element 12. Unfiltered fluid channel 42 helps fluid filter 22 adapt to a wide variety of engines and other fluid systems.

Figure 9:
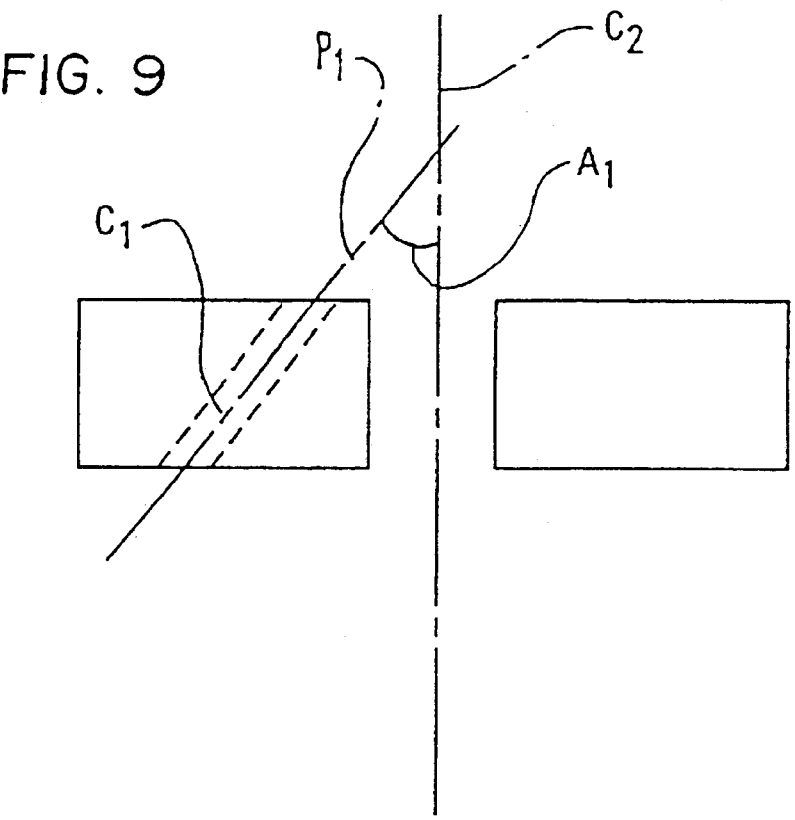
FIG. 9 shows a schematic side view of the adapter body.
Figure 10:
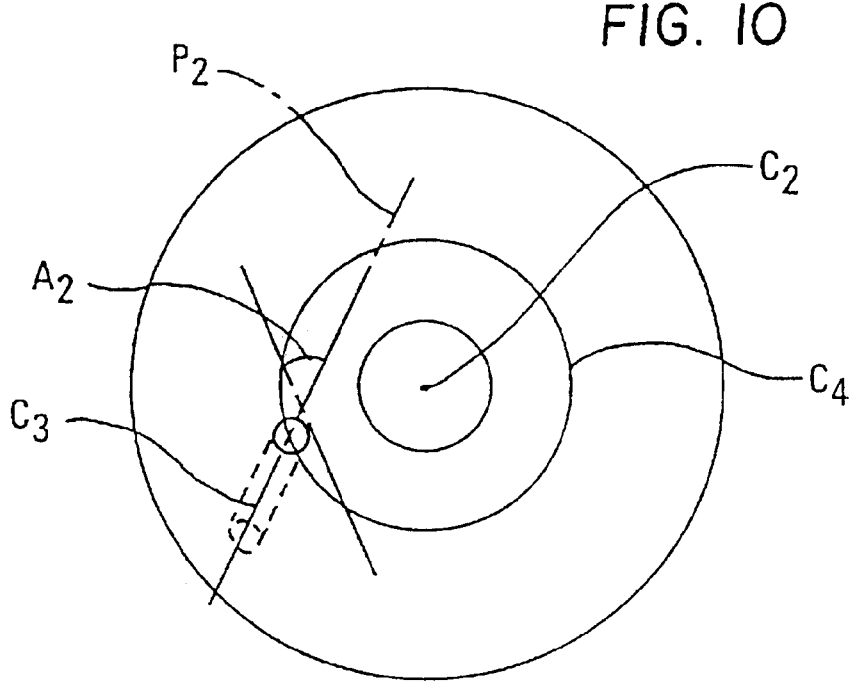
FIG. 10 shows a schematic top view of the adapter body.

Unfiltered fluid inlet orifices means for creating a turbulent swirling fluid motion 46 are formed at an angle to the axis of canister 10 in order to create a turbine or a swirling motion of unfiltered fluid in the unfiltered fluid compartment 48. Planes $P_1$ coincident with the central axis $C_1$ of each respective inlet orifice intersect the central axis $C_2$ of the canister at a point exteriorly of and adjacent to the outside face 32 of the adapter body to form a first acute interior angle $A_1$ therewith as shown in FIG. 9. In addition, planes $P_2$ coincident with respective central axes $C_3$ of the inlet orifices and parallel to the central axis $C_2$ of said canister each form a second acute interior angle $A_2$ with respective planes that are tangent to a cylindrical reference surface $C_4$ coaxially surrounding the central axis $C_2$ of the canister and intersecting the central axis $C_2$ of the respective inlet port at said outside face 32 as shown in FIG. 10. Preferably, the first and second acute angles $A_1$, $A_2$ are about 60 degrees. This angled fluid inlet orifice 46 creates a swirling fluid motion inside canister 10 which is circular around filter element 10 to suspend contaminant particles in the unfiltered fluid. Spanner wrench holes 50 are formed in adapter body 14 for use with a spanner wrench (not shown) to facilitate attachment and removal of the adapter body 14, with threaded adapter ring 16, with engine block 24. Spanner wrench holes 50 are also adaptable for use with a metal rod (not shown) for attaching and removing adapter body 14.

Fluid outlet aperture 44 is formed in adapter body 14 and has a threaded portion 54 to adapt to the external threads 18 on threaded adapter ring 16. Fluid outlet aperture 44 extends through adapter body 14 and filter sleeve 56 on the inner face 30 of adapter body 14. Filter sleeve 56 has an annular channel 55 formed along the inside surface of outlet aperture 44. Cap o-ring 57 is mounted in channel 55. It should be understood that fluid outlet aperture 44 is not in fluid communication with unfiltered fluid inlet orifices 46, unfiltered oil channel 42 or unfiltered oil ports 40 when reusable filter 22 is assembled and mounted on engine block 24. Hexagonal surface 59 is formed around filter sleeve 56 to adapt a socket wrench (not shown) to adapter body 14 for mounting to filter stub 26. As shown in FIG. 2, external canister threads 58 are formed in adapter body 14 for threadably adapting to canister 10. Adjacent external canister threads 58, canister o-ring 60 is mounted on adapter body 14. Canister o-ring 60 is positioned to form an oil tight seal between adapter body 14 and canister 10.

An anti-syphon valve 62 shown as a rubber frustoconical baffle in FIG. 1 is mounted on filter sleeve 56 to prevent unfiltered oil from leaving the unfiltered oil compartment 48 and passing out of the reusable oil filter 22 and into engine block 24 through unfiltered fluid inlet orifices 46. Anti-syphon valve 62 may also be a flat rubber baffle formed to fit between filter sleeve 56 and canister threads 58. Anti-syphon valve 62 is retained adjacent unfiltered fluid inlet orifices 46 and may be removably mounted on filter sleeve 56 as shown in FIG. 2. It should be understood that as oil is forced through the unfiltered fluid inlet orifices 46, anti-syphon valve 62 will deform, allowing oil to pass around the anti-syphon valve 62. In the event that oil is syphoned from reusable oil filter 22 through unfiltered fluid inlet orifices 46, anti-syphon valve 62 will return to its original shape sealing orifices 46 and preventing unfiltered oil from passing into engine block 24.

Reusable filter element 12 comprises a cleanable element having a first end 63.3, a second end 63.4, an outside cylindrical wall 64 and an inside cylindrical wall 66. Each cylindrical wall 64, 66 is substantially the same length. Outer filter ring 65 is attached to outer wall 64 at each end and has an outer diameter smaller then canister 10 to allow easy insertion and removal. An inner filter ring 67 is attached to inside cylindrical wall 66 at each end. Hollow core 68 is defined by inside cylindrical wall 66 and is used as a reservoir for filtered fluid passing to engine block 24 through filtered oil tube 27. Filtered fluid compartment shown as hollow core 68 opens from filter element 12 at fluid exit opening 70 formed in filter element top 72. When filter element 12 is assembled, inner filter ring 67 is concentrically mounted inside outer filter ring 65. The filter rings 65, 67 are made from a moldable material such as plastic or rubber, which will form an oil tight seal between inner filter ring 67 and outer filter ring 65. Filter element top 72 is mounted at the first end 63.3 of filter element 12 in the hollow core 68 and extends over filter element rings 65, 67 to provide additional oil tight seal. Filter element top 72 has outside surface 73 which sealingly fits against inner surface 75 of inner filter ring 67. It should be understood that outer filter ring 65 and inner filter ring 67 prevent fluid from passing from unfiltered fluid compartment 48 to partially filtered fluid compartment 74, defined by outside cylindrical wall 64 and inside cylindrical wall 66, without being filtered. Filter element top 72 is mounted at one end of the assembled filtered cylindrical walls 64, 66 to adapt the filter element to the adapter body and provide an oil tight seal. Fluid exit opening 70 extends from filter element top 72 along filtered fluid nipple 77.

Filtered fluid nipple 77 has an outside diameter which is sized to fit the inside diameter of filter sleeve 56 and seal against cap o-ring 57.

Outside cylindrical wall 64 and inside cylindrical wall 66 are formed of a cleanable mesh 63 which is woven from a material such as metallic wire. As in the preferred embodiment, the cleanable mesh 63 is structurally supported with a large wire mesh 63.1 having mesh openings of approximately 1 mm. This dimension is not designed to limit the scope of the invention but merely illustrate an embodiment of the structural support for the cleanable wire mesh 63.

Figure 3A:
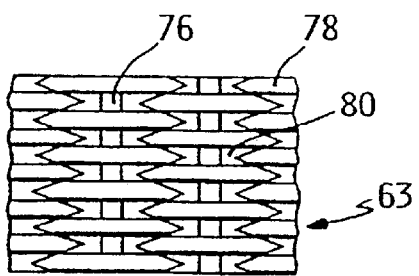
FIG. 3a is a section view of a filter mesh material taken at approximately 3—3 FIG. 2.
Figure 3B:
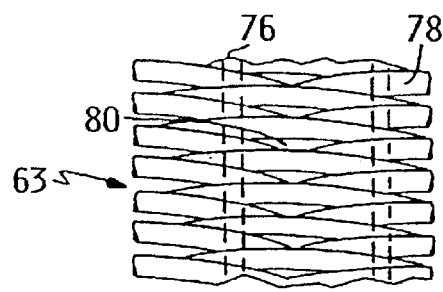
FIG. 3b is a section view of an alternate filter mesh material taken at approximately 3—3 of FIG. 2.

FIGS. 3a and 3b illustrate mesh 63 patterns that may be used to form cylindrical walls 64, 66. Wire mesh 63 may be woven in a variety of weaves. The weave defines how the wire is woven. In the preferred embodiment, the filter element 12 is formed of a wire mesh 63 having an elongated, tapered or wedge shaped opening 80 such as a plain Dutch or modified Dutch weave. As shown in FIG. 3, a Dutch weave uses larger diameter wires for the warp 76 and smaller diameter wires for the shute 78. This type of weave results in a tapered or wedged shape opening 80 which will filter contaminants but discourage contaminant particles from becoming lodged in filter element 12. An alternate weave, shown in FIG. 3a, is called a Twilled-Dutch weave as available from Ron-Vik, Inc., Minneapolis, Minn. It should be understood that by removing the contaminant particles without trapping particles in the filter element 12, maintenance intervals may be extended for cleaning and servicing the reusable filter and adapter 22. Filter element top 72 provides support for outside cylindrical wall 64 and inside cylindrical wall 66 as well as preventing fluid from passing from unfiltered fluid compartment 48 to hollow core 68 without passing through each cylindrical wall 64, 66.

It should be understood that outside cylindrical wall 64 is made from a fabric which has a weave having filter openings 80 which are larger than the filter openings 80 of the inside cylindrical wall 66. This progressive increase in filter openings 80 from the hollow core 68 to the unfiltered fluid compartment 48 provides for a multistage filter element that extends the maintenance interval of the reusable oil filter 22. The multistage filter element 12 progressively filters contaminant particles from the fluid. This progressive filtering also increases the filter mesh 63 area comprising filter element 12 which results in a longer maintenance interval.

It should be understood that filter rings 65, 67 may be made of metal and be concentrically mounted to each other with the use of an o-ring to seal between filter rings. It should also be understood that an o-ring may be used to seal between inside filter ring 67 and filter element top 72 which may be all or partially made from metal.

In the preferred embodiment, shown in FIG. 2, hollow core 68 extends the length of filter element 12. Bypass opening 84 extends from hollow core 68 to unfiltered fluid compartment 48 at the second end of the reusable filter element 12. Bypass opening 84 is sealed by support plate 88 shown in FIG. 2 comprising relief valve indicated in general by the numeral 86. Relief valve 86 comprises support plate 88 which mounts in the bottom of canister 10 to support filter element 12. Support plate 88 has valve hole 90 which has a smaller diameter than bypass opening 84 and shoulder 92 which sealing fits against inside filter ring 67 at surface 83. Valve hole 90 is concentrically aligned with bypass opening 84. Valve plate 94 has a plurality of spring holders 96 extending away from hollow core 68. Valve spring 98 is mounted circumferentially around spring holders 96 and bears against spring seat 100. Valve Spring 98 also bears against support plate 88 at valve spring surface 101. Valve plate 94 is positioned over valve hole 90 to provide an oil tight seal between unfiltered oil compartment 48 and hollow core 68. Valve spring 98 bears against spring seat 100 and support plate 88 to urge valve plate 94 to seal valve hole 90.

It should be understood that if filter element 12 becomes clogged with contaminants, pressure in the unfiltered fluid compartment 48 may become very great due to oil being forced into fluid filtered 22 through inlet orifice 46. This condition will create a pressure differential between hollow core 68 and the unfiltered fluid compartment 48. When this pressure differential reaches a predetermined force, pressure against valve plate 94 will overcome spring 98 causing a direct fluid communication through valve hole 90 between unfiltered fluid compartment 48 and hollow core 68.

This arrangement will allow unfiltered fluid to flow directly from the unfiltered fluid inlet orifices 46 through the unfiltered fluid compartment 48 and into hollow core 68 to return to engine block 24 through filtered oil tube 27.

Canister 10 has cylindrical external wall 104 and cylindrical inner wall 105. Canister body opening 106 as shown in FIG. 2 has internal threads 108 circumferentially formed on canister 10. Sealing shoulder 110 is formed adjacent internal threads 108 to sealingly engage canister o-ring 60 as canister 10 is threadably attached to adapter body 14. Contaminant trap 112 is formed between support plate 88 and bottom wall 114 of canister 10. Contaminant openings 116 are formed in support plate 88 to allow contaminant particles to settle out of fluid which is swirling in unfiltered fluid compartment 48 and into contaminant trap 112. As mentioned above, filter element 12 is comprised of a wire mesh 63 having tapered openings 80 which are formed to prevent contaminants particles from becoming lodged in the opening and plugging the filter element 12. Drain hole 118 is formed in bottom wall 114 and is closed by drain plug 122. Drain hole 118 has internal threads 120 to threadably accept drain plug external threads 124. In the preferred environment, drain plug 122 is made from a magnetizable material such as iron which may be magnetized to attract various contaminant particles.

Figure 8:
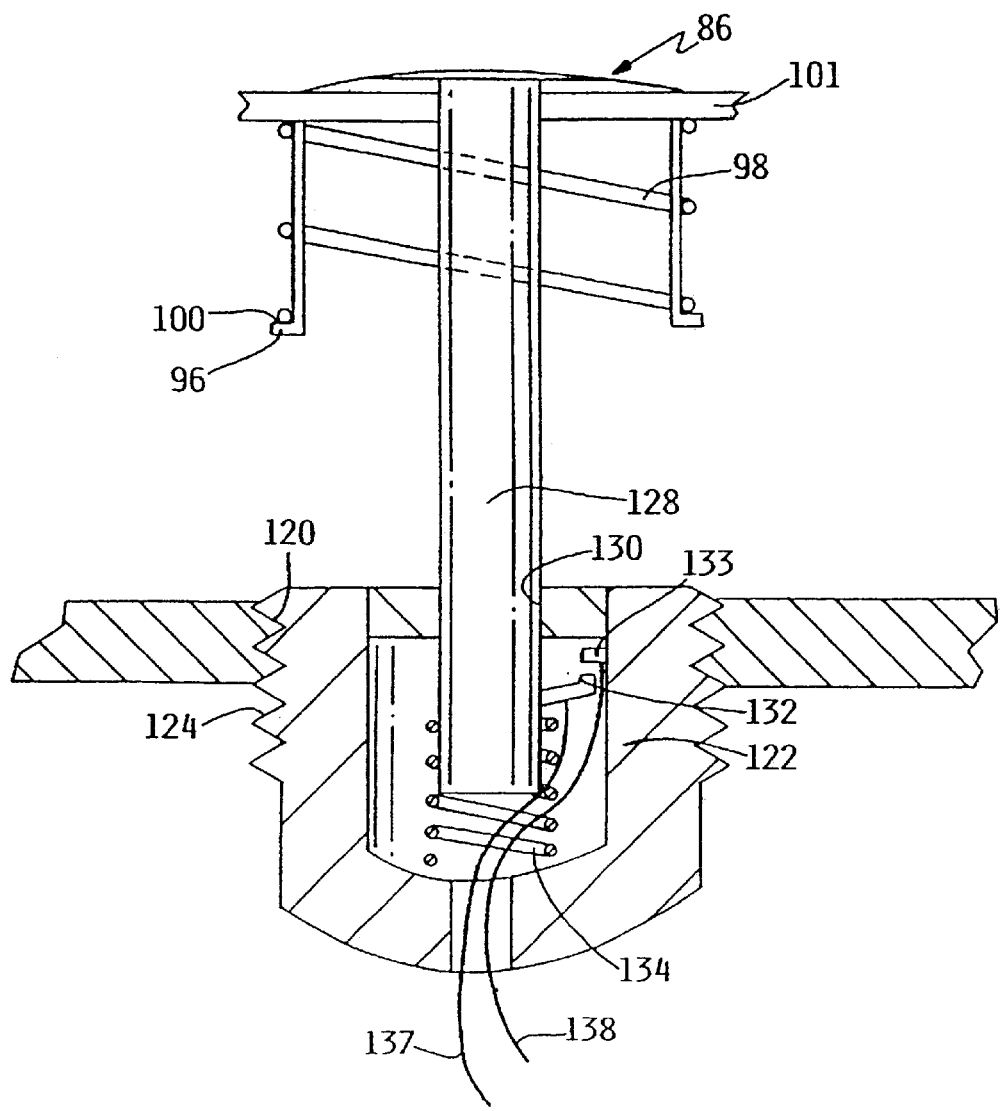
FIG. 8 is a detail section view taken at approximately 8—8 of FIG. 2.
Figure 4:
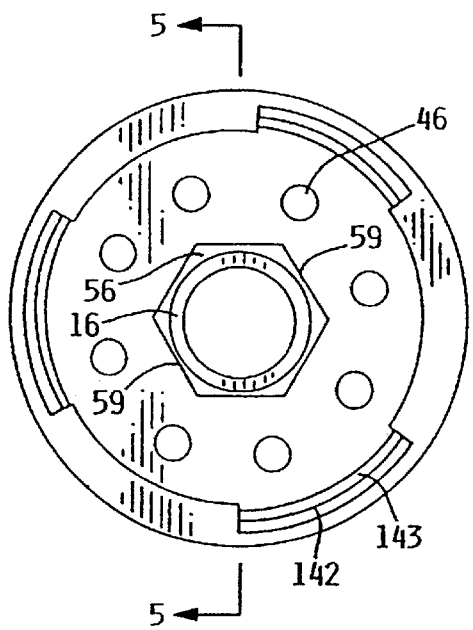
FIG. 4 is a perspective view of the inner face of an adaptor body showing an alternative connection means.
Figure 5:
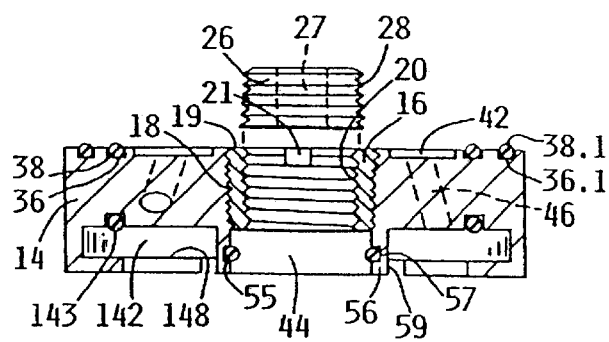
FIG. 5 is a detail section view taken at approximately 5—5 of FIG. 4.
Figure 7:
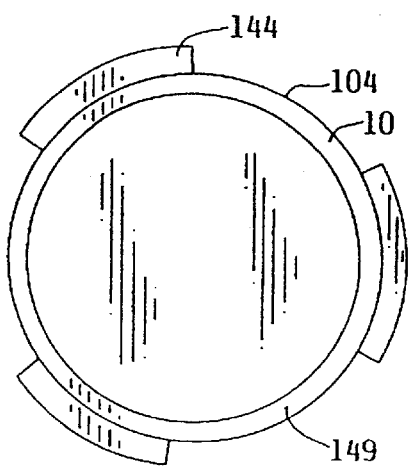
FIG. 7 is an elevated perspective view of the canister illustrating the alternative connection means.
Figure 6:
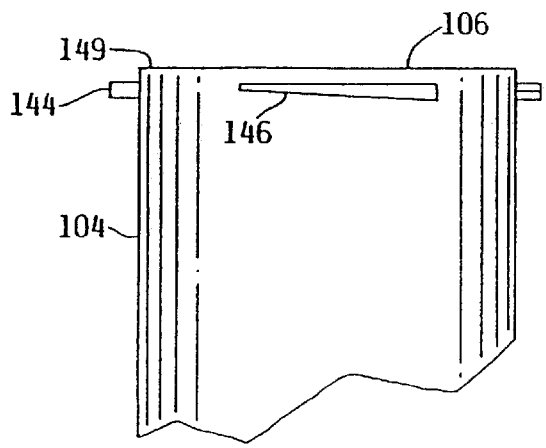
FIG. 6 is a perspective view of the canister showing an alternative connection means.

In addition, pressure switch 126 is mounted in fluid filter 22. Pressure switch 126 actuates a warning light when pressure reaches a predetermined level in fluid filter 22. Pressure switch 126 comprises switch actuator 128 which extends through drain plug 122, as shown in FIG. 8, at drain plug switch hole 130.

Pressure switch 126 further comprises electrical contacts 132 and 133 which are aligned with each other but biased apart by spring 134. Switch spring 134 also biases actuator 128 to bear against valve plate 94. When the pressure differential between the unfiltered fluid compartment 48 and hollow core 68 is great enough to overcome the tension of spring 98 causing valve plate 94 to move creating a fluid communication between compartment 48 and hollow core 68, actuator 128 will ride on valve plate 94 and cause electrical contact 132 which rides on actuator 128, to move and come into electrical contact with electrical contact 133. This electrical contact will create a closed circuit path for electricity to flow from electrical contact 133 to electrical contact 132. Electrical conductor 137 connects to the electrical first pole of the power supply (not shown) and to electrical contact 132. Electrical conductor 138 will connect to electrical contact 133. Pressure switch may be used to warn of over pressure situation by measures such as audible alarm or input to control system (not shown).

An alternative embodiment shown in FIGS. 4–7 illustrates an alternative connecting means between canister 10 and adapter body 14. Canister slots 142 are formed in adapter body 14 along the peripheral of inside face 30. Tab o-ring 143 is mounted on inside face 30 adjacent canister slots 142. Canister tabs 144 are welded on canister 10 to align with canister slots 142. It should be noted that canister tabs 144 have sealing surface 146 which is angularly formed along canister tabs 144 to draw canister 10 tightly to adapter body 14. Canister slots 142 on adapter body 14 have receiving surfaces 148 to receive sealing surfaces 146 and assist in drawing canister 10 and adapter body 14 together. Canister shoulder 149 is formed adjacent the open end of canister 10 to sealingly bear against tab o-ring 143 to form an oil tight seal between canister 10 and adapter body 14.

In operation as an oil filter, the reusable fluid filter 22 is purchased with a filter element 12 suitable for the fluid to be filtered. A threaded adapter ring 16 is also purchased to adapt the standard reusable fluid filter 22 to the desired engine. The threaded adapter ring 16 is threadably mounted in the adapter body 14 which is threadably mounted on engine block 24 at the oil filter receptacle comprising filter stub 26 and unfiltered oil ports 40, forming an oil tight seal with o-rings 36, 36.1. Filter element 12 is sealingly and slidably attached in filter sleeve 56. Canister 10 with support plate 88 mounted therein is slid over filter element 12 and attached to adapter body 14. Magnetized drain plug 122 is inserted into drain plug hole 118 and an electrical connection is made to electrical conductors 137, 138. Engine block 24 is filled with oil and the engine is operated causing oil to be filtered through the reusable fluid filter 22 until a periodic maintenance interval occurs or the pressure switch light 136 becomes illuminated. At that time the engine is shut down and the reusable fluid filter 22 is cleaned.

The magnetized drain plug 122 is first removed to drain oil from the canister 10. This is done to control the flow of oil from the canister 10 and to prevent spill or injury to personnel. Drain plug 122 also makes canister 10 easier to handle due to the weight reduction as oil is drained from drain hole 118. In addition, magnetized drain plug 122 is cleaned of all contaminants. Drain hole 118 is cleaned of all contaminants prior to reinsertion of drain plug 122.

Canister 10 is than removed from adapter body 14 and filter element 12 removed from filter sleeve 56. Support plate 88 is removed from canister 10 and contaminant particles trapped in contaminant trap 112 are removed.

Adapter body 14 with threaded adapter ring 16 remains attached to engine block 24 at filter stub 26.

Filter element 12 is cleaned in a parts cleaner by methods well known in the art to remove contaminant particles from the mesh openings and contaminant films that may have formed on the wires 76, 78.

Figure 12:
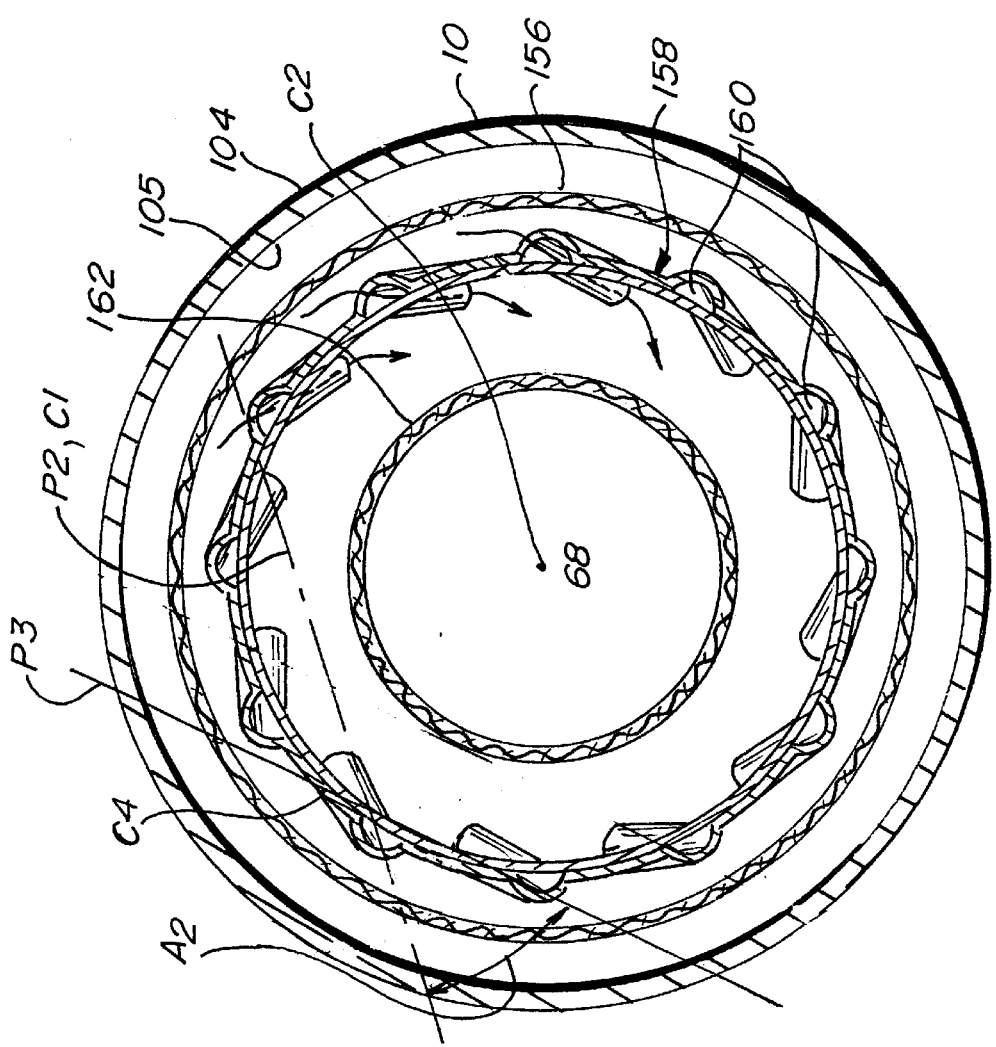
FIG. 12 is a cross-section along the lines 12 of FIG. 11.

A second embodiment of the reusable fluid filter is shown in FIGS. 11–13.

The embodiment shown in FIGS. 11–13 differs from the first embodiment in several ways.

First, reusable filter element 12 comprises an outer filter screen 156, an inner filter screen 162, and a ported cylinder 158. The structure of outer filter screen 156 and inner filter screen 162 may preferably be the same as that of the first embodiment. That is, outer filter screen 156 and inner filter screen 162 may preferably comprise a cleanable mesh 63 which is woven from a material such as metallic wire, as previously described. Larger particles are filtered out by the outer filter screen 156, and the partially-filtered fluid is then directed against the inner filter screen 162, which has filter mesh openings that are smaller than those of the outer filter screen 156, thus filtering out smaller particles. Also, because the larger particles have been filtered out by outer filter screen 156, they do not clog inner filter screen 162. Illustratively, the outer filter screen may have 50 micron mesh openings while the inner filter screen has 25 micron mesh openings.

Ported cylinder 158, best seen in FIG. 13, further comprises a cylindrical member 158.1 having an open bottom 158.2, open top 158.3, and a side wall 158.4. A plurality of angled oil-directing openings 160 extend from the partially-filtered fluid compartment 164 (between the outer filter screen 156 and inner filter screen 162) toward the inner filter screen 162.

As seen in FIG. 13, the angled oil-directed openings 160 each include a central axis C1 and are configured such that a plane coincident with central axis C1 intersects the central axis C2 of the canister 10 to form a first acute interior angle A1 therewith. Furthermore, as shown in FIG. 12, a plane P2 coincident with central axis C1 and parallel with the central axis C2 of the canister 10 forms a second acute interior angle A2 with a plane P3 that intersects the central axis C1 of the angled oil-directing opening at a point where the plane P3 is tangent to a cylindrical reference surface C4, wherein the cylindrical reference surface C4 is located concentrically midway between a radially inner surface and a radially outer surface of the sidewall of the cylindrical member 158.1. This structure causes a swirling fluid motion in the partially-filtered compartment 164 and directs the oil in a swirling motion against the inner filter screen 162, as shown by the arrows in FIG. 12. As previously described, this swirling motion keeps contaminants suspended in the partially-filtered fluid to be filtered by the inner filter screen 162, and then assists in trapping sediments in a contaminant trap 175 between the inner filter screen 162 and outer filter screen 156. O-rings 178 are used between the inner filter screen 162 and outer filter screen 156 to prevent the escape of oil from the unfiltered fluid compartment 48 and partially-filtered fluid compartment 164 to the hollow core 68.

Most preferably, the first acute interior angle is about sixty degrees and the second acute interior angle is about sixty degrees.

It should be noted that the ported cylinder 158 may be used in addition to the angled oil inlet ports 46, previously described. In such a case, the ported cylinder 158 re-establishes the swirling motion caused by the angled oil inlet ports 46 that is lost when fluid passes through the outer filter screen 156. Alternatively, the ported cylinder 158 maybe used instead of the angled oil inlet ports 46.

Figure 15:
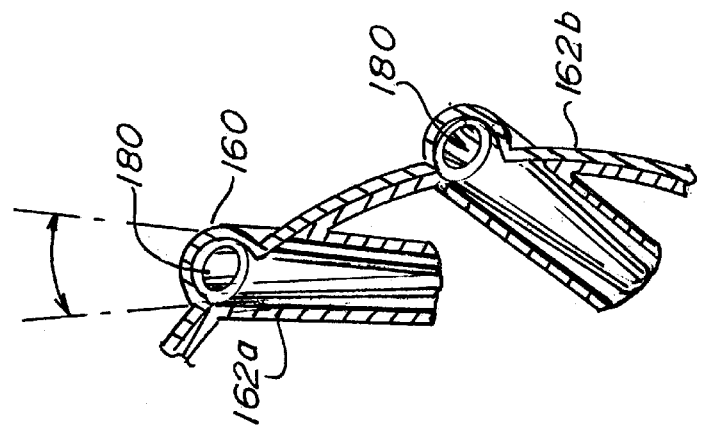
FIG. 15 is a detailed view of the ported cylinder, showing the structure of the ported cylinder and the angled oil-directing openings.

Additional detail of the angled oil directing openings 160 in the ported cylinder 162 may be seen in FIG. 15. The openings 160 may be formed by putting two perforated cylinders 162A, 162B back to back to form the openings 160. The cylinders 162A, 162B may then be spot welded 163 together between the perforations.

Optionally, venturi tubes 180 may be inserted into the openings 160 to further increase the velocity of the fluid directed against the inner screen 162.

The second embodiment shown in FIGS. 11–13 also differs from the first embodiment in the structure connecting the reusable filter element 12 to the adapter body 14. In the embodiment shown in FIGS. 11–13, as best seen in FIG. 13, the reusable filter element 12 has a collar 170 about the open end 158.3 and closed end 158.2. The collars 170 are made from a moldable material such as plastic or rubber which will form an oil-tight seal. The adapter body 14 has a nipple 172 which extends into and engages the open end 158.3 at the collar 170, and the nipple 172 is thus in fluid communication with the filtered fluid compartment 68. This structure is quite a bit simpler than the connecting structure described with the first embodiment. The support plate 88 may also have a nipple 172 mating with the collar 170 at the closed end 158.2.

Optionally, a second ported cylinder 190 may be provided adjacent to the inner screen 162 and between the inner screen 162 and the hollow core 68. A third screen (not shown) may also be added between the second ported cylinder 190 and the hollow core 68. Further ported cylinders and screens may also be added.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A reusable fluid filter for mounting on an engine having a filtered oil tube and an unfiltered oil port, the reusable fluid filter comprising:
   a) a one-piece cylindrical canister having an inner wall and a central axis, a closed end and an open end;
   b) a body having an inside face and an outside face, the body adapted to sealingly close the open end of the canister;
   c) a cylindrical, reusable filter mountable on the body, the filter extending into the canister and defining an unfiltered fluid compartment between the filter and the inner wall of the canister and a filtered fluid compartment separated from the unfiltered fluid compartment by the cylindrical, reusable filter;
   d) an oil inlet in the body in fluid communication with the unfiltered oil port in the engine and the unfiltered fluid compartment;

e) the cylindrical, reusable filter further comprising an outer filter screen adjacent to the unfiltered fluid compartment, an inner filter screen adjacent to the filtered fluid compartment, and a ported cylinder between the outer filter screen and the inner filter screen, the outer filter screen and inner filter screen enclosing a partially-filtered fluid compartment therebetween, wherein the ported cylinder further comprises a cylindrical member having an open bottom, an open top, and a side wall with a plurality of acutely angled oil-directing openings extending from the partially-filtered fluid compartment toward the inner filter screen, whereby the acutely-angled oil-directing openings cause a swirling fluid motion in the partially-filtered fluid compartment around the inner filter screen; and f) an outlet in the body extending from the filtered fluid compartment to the filtered oil tube.

2. The reusable fluid filter of claim 1, wherein the oil inlet includes a central axis, wherein a plane coincident with the central axis of the oil inlet intersects the central axis of the canister at a point exteriorly of and adjacent to the outside face of the body to form a first acute interior angle therewith, and wherein a plane coincident with the central axis of the oil inlet and parallel to the central axis of the canister forms a second acute interior angle with a plane that is tangent to a cylindrical reference surface coaxially surrounding the central axis of the canister and intersecting the central axis of the oil inlet at the outside face of the body, whereby the oil inlet causes a swirling fluid motion in the unfiltered fluid compartment around the filter.

3. The reusable fluid filter of claim 2, wherein the first acute interior angle is about sixty degrees and wherein the second acute interior angle is about sixty degrees.

4. The reusable fluid filter of claim 1, wherein each of the angled oil-directing openings includes a central axis, wherein a plane coincident with the central axis of the angled oil-directing opening intersects the central axis of the canister to form a first acute interior angle therewith, and wherein a plane coincident with the central axis of the angled oil-directing opening and parallel with the central axis of the canister forms a second acute interior angle with a plane that is tangent to a cylindrical reference surface located concentrically midway between a radially inner surface and a radially outer surface of said cylinder member and intersecting the central axis of the angled oil-directing opening, whereby the angle oil-directing opening causes a swirling fluid motion in the partially-filtered fluid compartment around the inner filter screen.

5. The reusable filter of claim 4, wherein the first acute interior angle is about sixty degrees and wherein the second acute interior angle is about sixty degrees.

6. The reusable fluid filter of claim 1, wherein each of the outer filter screen and inner filter screen comprise a woven mesh and wherein the woven mesh further comprises a plurality of warp wires extending substantially parallel to the axis of the canister, the warp wires having a size.

7. The reusable fluid filter of claim 6, wherein the woven mesh further comprises a plurality of shute wires woven in a substantially perpendicular relationship with the warp wires to define a plurality of filter openings in the cylindrical, reusable filter for allowing oil to pass through the cylindrical, reusable filter, the filter openings having a size smaller than a predetermined contaminant particle in the oil.

8. The reusable fluid filter of claim 7, wherein the filter openings further comprise an elongated shape to resist lodging one or more contaminant particles in one of the plurality of filter openings.

9. The reusable fluid filter of claim 1, further comprising a contaminant trap space in the closed end of the canister and wherein the inner filter screen has a plurality of filter mesh openings of a predetermined size and wherein the outer filter screen has a plurality of filter mesh openings which are larger than the filter mesh openings of the inner filter screen, to thereby provide a multistage filter element for progressively filtering contaminants of increasingly smaller size from the fluid as it passes from the unfiltered fluid compartment to the filtered fluid compartment.

10. The reusable fluid filter of claim 9, wherein the contaminant trap is between the outer filter screen and the inner filter screen.

11. The reusable fluid filter of claim 1, further comprising an adapter ring threadably connected to the outlet in the body, the adapter ring having internal threads for threadably connecting to the engine.

12. The reusable fluid filter of claim 1, further comprising a nipple on the body in fluid communication with the filtered fluid compartment and extending into and engaging the open end of the cylindrical, reusable filter to connect the filter to the body.

13. A reusable fluid filter for mounting on an engine having a filtered oil tube and an unfiltered oil port, the reusable fluid filter comprising:

a) a one-piece cylindrical canister having an inner wall and a central axis, a closed end and an open end;

b) a body having an inside face and an outside face, the body adapted to sealingly close the open end of the canister;

c) a cylindrical, reusable filter mountable on the body, the filter extending into the canister and defining an unfiltered fluid compartment between the filter and the inner wall of the canister and a filtered fluid compartment separated from the unfiltered fluid compartment by the cylindrical, reusable filter;

d) an oil inlet in the body in fluid communication with the unfiltered oil port in the engine and the unfiltered fluid compartment;

e) the cylindrical, reusable filter further comprising an outer filter screen adjacent to the unfiltered fluid compartment, an inner filter screen adjacent to the filtered fluid compartment, and a ported cylinder between the outer filter screen and the inner filter screen, the outer filter screen and inner filter screen enclosing a partially-filtered fluid compartment therebetween, wherein oil-directing openings through said ported cylinder cause a swirling fluid motion in the partially-filtered fluid compartment around the inner filter screen;

f) an outlet in the body extending from the filtered fluid compartment to the filtered oil tube; and g) a nipple on the body in fluid communication with the filtered fluid compartment and extending into and engaging the open end of the cylindrical, reusable filter to connect the filter to the body.

14. The reusable fluid filter of claim 13, wherein the oil inlet includes a central axis, wherein a plane coincident with the central axis of the oil inlet intersects the central axis of the canister at a point exteriorly of and adjacent to the outside face of the body to form a first acute interior angle therewith, and wherein a plane coincident with the central axis of the oil inlet and parallel to the central axis of the canister forms a second acute interior angle with a plane that is tangent to a cylindrical reference surface coaxially surrounding the central axis of the canister and intersecting the central axis of the oil inlet at the outside face of the body, whereby the oil inlet causes a swirling fluid motion in the unfiltered fluid compartment around the filter.

15. A reusable fluid filter for mounting on an engine having a filtered oil tube and an unfiltered oil port, the reusable fluid filter comprising:

a) a one-piece cylindrical canister having an inner wall and a central axis, a closed end and an open end;
  b) a body having an inside face and an outside face, the body adapted to sealingly close the open end of the canister;
  c) a cylindrical, reusable filter mountable on the body, the filter extending into the canister and defining an unfiltered fluid compartment between the filter and the inner wall of the canister and a filtered fluid compartment separated from the unfiltered fluid compartment by the cylindrical, reusable filter;
  d) an oil inlet in the body in fluid communication with the unfiltered oil port in the engine and the unfiltered fluid compartment;
  e) the cylindrical, reusable filter further comprising an outer filter screen adjacent to the unfiltered fluid compartment, an inner filter screen adjacent to the filtered fluid compartment, and a ported cylinder between the outer filter screen and the inner filter screen, the outer filter screen and inner filter screen enclosing a partially-filtered fluid compartment therebetween;
  f) an outlet in the body extending from the filtered fluid compartment to the filtered oil tube;
  g) a nipple on the body in fluid communication with the filtered fluid compartment and extending into and engaging the open end of the cylindrical, reusable filter to connect the filter to the body; and
  h) wherein the ported cylinder further comprises a cylindrical member having an open bottom, an open top, and a side wall with a plurality of angled oil-directing openings extending from the partially-filtered fluid compartment toward the inner filter screen, whereby the angled oil-directing openings cause a swirling fluid compartment around the inner filter screen.

16. The reusable fluid filter of claim 15, wherein each of the angled oil-directing openings includes a central axis, wherein a plane coincident with the central axis of the angled oil-directing opening intersects the central axis of the canister to form a first acute interior angle therewith, and wherein a plane coincident with the central axis of the angled oil-directing opening and parallel with the central axis of the canister forms a second acute interior angle with a plane that is tangent to a cylindrical reference surface located concentrically midway between a radially inner surface and a radially outer surface of said cylinder member and intersecting the central axis of the angled oil-directing opening, whereby the angle oil-directing opening causes a swirling fluid motion in the partially-filtered fluid compartment around the inner filter screen.

17. The reusable fluid filter of claim 15, further comprising a plurality of venturi tubes in the angled oil-directing openings adapted to increase the velocity of the fluid.

* * * * *